Patented Mar. 13, 1923.

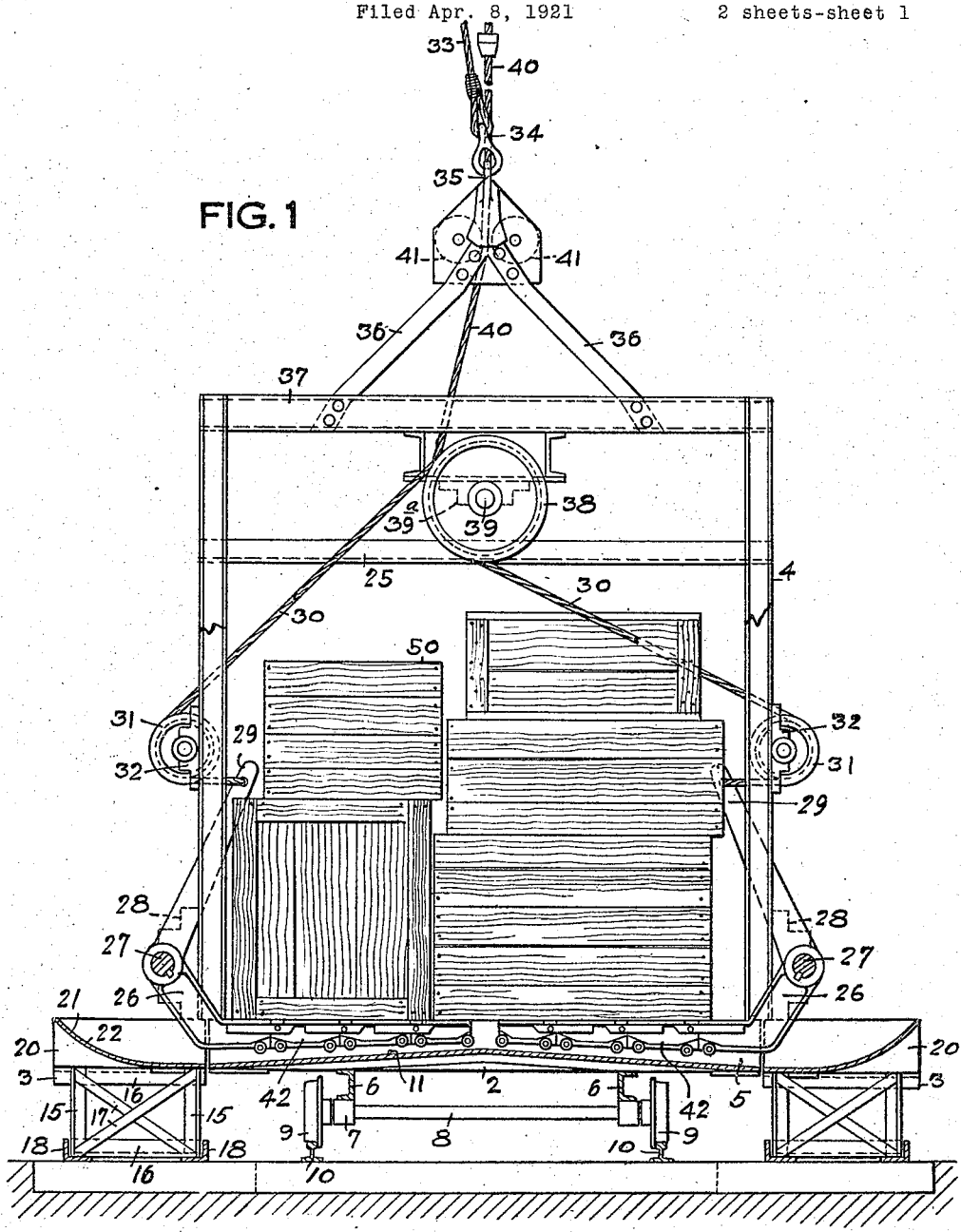

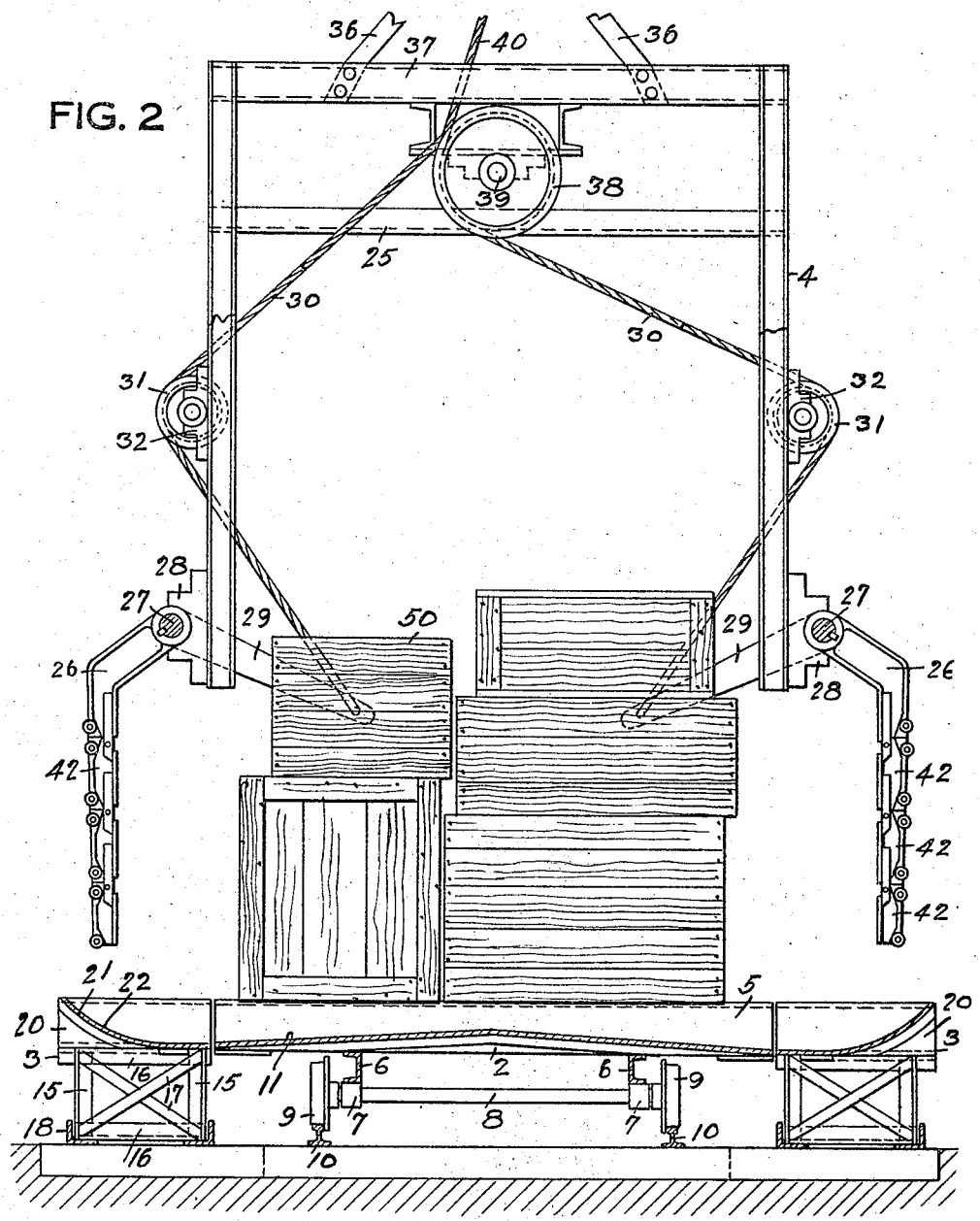

1,448,311

UNITED STATES PATENT OFFICE.

WILLIAM BOYD MILLER, OF PITTSBURGH, PENNSYLVANIA.

MERCHANDISE CARRIER.

Application filed April 8, 1921. Serial No. 459,769.

*To all whom it may concern:*

Be it known that I, WILLIAM BOYD MILLER, a citizen of the United States, and resident of Pittsburgh, in the county of Allegheny and State of Pennsylvania, have invented a new and useful Improvement in Merchandise Carriers; and I do hereby declare the following to be a full, clear, and exact description thereof.

My invention relates to a loading and unloading device for use in picking up a number of boxes or packages of merchandise at one time and unloading them together at a desired place.

My present application relates to the same general type of apparatus as that described and claimed in Letters Patent of the United States, No. 1,022,104 granted to me April 2, 1912. It is my present object to simplify and otherwise improve the construction shown in my patent.

Like my patented apparatus, my present invention is applicable to many loading, unloading and conveying purposes where it is necessary to seize and elevate, load or convey articles which must not be mutilated, jarred or broken, and which are to be conveyed from one floor to another of a warehouse or the like, or are to be loaded upon or unloaded from ships, barges, freight cars, or other transporting means.

My patented apparatus included two cooperating sets of parts, one a platform for receiving the goods to be transported, and the other a lifting device adapted to be lowered upon the platform and provided with arms in the nature of linked cantilevers pivoted to the carrier and adapted to pass beneath the articles and lift them from the platform. This loading platform, with its guides for the descending lifter and for the cantilever arms, necessarily projects a considerable distance from both sides of the merchandise, and the apparatus was therefore not suitable for use in many situations where little space is available.

The construction shown in my prior patent is especially inconvenient when it is desired to incorporate the loading and unloading features of my platform truck in the body of an automobile truck or industrial railway car. In such case the projecting sides of the platform truck are useful only in loading or unloading merchandise to or from the platform truck, and these projecting sides require a considerable amount of clearance for the industrial car or auto truck.

My present invention is of special utility in this connection. The projecting sides formerly employed as a part of the platform truck are removed from the truck and are replaced by relatively stationary guides placed at suitable loading and unloading points. When the truck or industrial car is stopped so that the transverse beams and guides in the car body or truck body register opposite the corresponding beams and guides in the fixed guide members, these parts cooperate to produce the same function as in the platform truck of my prior patent.

In the accompanying drawing, Fig. 1 is a side elevational view with parts in section, showing a device constructed in accordance with my invention; and Fig. 2 is a similar view of the same device showing the lower supporting members in a different position.

As shown in the drawing the apparatus comprises a movable car or truck designated generally by the numeral 2, two relatively stationary guide structures 3, and lifting mechanism designated generally by the numeral 4. The car 2 is intended to represent any form of wheeled conveyer, such, for example, as a platform truck, an auto truck, or an industrial railway car. As shown in the drawing, the car 2 consists of a framework suitably composed of transverse beams 5 supported on channel bars 6 that carry bearings 7 in which are journaled axles 8, to the ends of which are attached wheels 9 resting upon tracks 10. It is to be understood that this particular car construction is shown for the purpose of illustration only, and that the car may either travel upon rails, as shown or upon ordinary auto-truck or wagon wheels. Between the beams 5 are cantilever guides 11 conveniently formed of bent sheet metal, a pair of symmetrically positioned guides being carried between each pair of beams 5.

Each of the stationary guide structures 3 consists of a suitable supporting framework composed of vertical beams 15, horizontal beams 16 and transverse braces 17, the box-like structure formed by these beams and braces resting on a suitable support consisting, for example, of angle beams 18 which permit the guide members to be moved lengthwise to make any slight corrections that may be necessary with respect to the position of the guides 11 on the car 2. A set of short beams 20 corresponding in number and spacing to the beams 5 carried by the car 2 are mounted upon the supporting structure, and curved cantilever guides 21 are secured between the adjacent pairs of beams 20. When the car 2 is brought into position with its beams 5 registering with the corresponding beams 20 on the stationary guide supports 3, the cantilever guides 11 and 21 cooperate to form a channel having a double curve, the portion 22 sloping down from the outside in the direction of entrance of the linked cantilevers, and the portions 6 carried by the car being inclined upwardly toward the meeting point of the guides at the middle of the beams 5.

The carrier 4 may be similar in all respects to the carrier shown in my Patent No. 1,022,104, and consists of a frame 25 on which are pivotally mounted two sets of cantilever arms 26, the cantilever arms at each side of the carrier being fulcrumed on a rock shaft 27 carried in bearings 28 on opposite sides of the frame 25. Each rock shaft 27 is provided with lever arms 29 preferably arranged in pairs at opposite ends of the rock shaft, and connected to a line, chain or wire rope 30 passing around sheaves 31 which are mounted in corresponding pairs in bearings 32 on the side members of the frame 25.

The frame 25 is suspended by any suitable means from a crane or like carrying device, not shown, by a line 33 connected thereto in any suitable manner, as by means of a clevis 34 and a hook 35, carried by suspending arms 36 attached to the top cross members 37 of the frame 25.

Each pair of lines 30 at the sides of the frame 25 extends upwardly from the sheave 31 to encircle a sheave 38 which is mounted on a shaft 39 carried in suitable bearings 40 at the top of the frame 25. The shaft 39 also carries a central pulley actuated by a controlling line 40 guided preferably by sheaves 41 and operated from a crane, derrick or the like, as is well understood in the art.

It is obvious that any suitable carrying or transporting device may be employed within the limits of my invention, and that the particular construction of the frame and the particular means for controlling and actuating the pivoted arms or cantilevers may be varied in many respects.

Each of the cantilever arms 26 consists of a number of links 42 pivoted to each other, as clearly shown and described in my Patent No. 1,022,104. The construction of these arms is therefore not described in further detail herein.

As stated above, the stationary cantilever guide structures 3 are located at any points where it is desired to load and unload merchandise. Assuming that the merchandise indicated at 50 has been piled by hand or by any other suitable means upon the transverse beams 5 of the car 2, and that it is desired to pick up and transport these packages or boxes, the carrying device 4 carrying the cantilever arms 26 is moved into position above the car 2, the cantilevers being allowed to assume the depending position shown in Fig. 2 by proper manipulation of the controlling line 40 and the consequent relaxation of the ropes 30. Any slight shifting of the position of the carrier 4 to bring it correctly down upon the guides may easily be taken care of by the operator, and if the stationary guides 4 do not register properly with the guides 11 on the car 2, either the car or the guide supports 3 should be moved slightly so as to bring the parts into proper registry. As the carrier descends the lower ends of the jointed cantilever arms 6 engage the downwardly sloping guides 21 and, on the further descent of the carrier frame, are caused to pass beneath the goods carried on the car 2. If desired, the car 2 may be provided with vertical guides similar to the guides 44 shown in my prior patent, for insuring the proper insertion of the cantilever arms in the guideways. The proper positioning of the cantilevers under the goods is also aided by proper manipulation of the line 40. As soon as the ropes 30 are drawn taut the goods may be raised from the car 2 by means of the carrying lines, and the goods are then transported to the desired unloading point.

In unloading the merchandise a pair of stationary guide supports 3 is preferably employed, and also a car or other support similar to the car 2. The carrier is lowered until the goods rest upon the receiving car, and upon allowing the ropes 30 to become slack the carrier may be removed by means of the carrying lines, the cantilever arms being free to withdraw and being guided in their outward movement by the registering guides 11 and 21.

The details of construction which I have shown and described may be varied in many respects without departing from my invention. I therefore desire that no limitations be imposed on my invention except such as are indicated in the appended claims.

I claim as my invention:

1. Means for lifting and transporting merchandise comprising a movable car, relatively stationary guide members spaced apart the approximate width of the said car, and a lifter provided with pivotally movable arms, the said car and guide members being provided with registering guides for directing the said pivoted arms beneath the goods carried on the said car.

2. Means for lifting and transporting goods comprising a movable car, two guide structures spaced apart the approximate width of the said car and individually movable lengthwise with respect to the said car, the said car and said guide structures being provided with registering guides, and a lifter provided with pivotally movable arms adapted to engage the said guides and to pass beneath the goods carried on the said car.

3. Means for conveying merchandise comprising a wheeled car having transversely extending supports for merchandise, guides disposed in the spaces between the said supports, two relatively stationary guide structures spaced apart the approximate width of the said car, guides carried by the said supports and adapted to register with the said guides on said car, a lifting frame, and jointed cantilever arms carried by the said lifting frame and adapted to engage the said registering guides and to pass between the said merchandise supports on the said car.

4. Apparatus for conveying merchandise comprising a wheeled car having spaced and transversely extending merchandise supports, sheet metal guides disposed between the said supports and sloping outwardly and downwardly from the center line of the car to the outer edges thereof, guide structures spaced apart the approximate width of the car, guides carried by the said guide supports and adapted to register with the said guides carried by the said car, the said guides carried by the said guide supports sloping downwardly and toward the said car, and a carrier frame provided with pivoted cantilever arms adapted to engage said guides and to pass beneath the merchandise carried on the said car.

In testimony whereof, I the said WILLIAM BOYD MILLER have hereunto set my hand.

WILLIAM BOYD MILLER.

Witnesses:
EDITH K. FREESE,
JOHN F. WILL.